United States Patent [19]

Light

[11] Patent Number: 4,678,070
[45] Date of Patent: Jul. 7, 1987

[54] FLUID COUPLING DEVICE HAVING IMPROVED HEAT DISSIPATION

[75] Inventor: Gerard M. Light, Marshall, Mich.

[73] Assignee: Eaton Corporation, Cleveland, Ohio

[21] Appl. No.: 861,651

[22] Filed: May 5, 1986

Related U.S. Application Data

[63] Continuation-in-part of Ser. No. 725,683, Apr. 22, 1985, abandoned.

[51] Int. Cl.⁴ .................... F16D 27/02; F16D 13/72
[52] U.S. Cl. ........................ 192/58 B; 192/113 A; 192/70.12
[58] Field of Search ............. 192/58 B, 113 A, 113 B, 192/70.12; 123/41.11, 41.12

[56] References Cited

U.S. PATENT DOCUMENTS

| Re. 30,608 | 5/1981 | Bopp . | |
|---|---|---|---|
| 2,713,928 | 7/1955 | Pohl | 192/113 A |
| 2,879,755 | 3/1959 | Weir . | |
| 2,963,135 | 12/1960 | Weir . | |
| 3,055,473 | 9/1962 | Oldberg et al. | 192/58 B |
| 3,075,691 | 1/1963 | Kelley . | |
| 3,135,370 | 6/1964 | Sutton . | |
| 3,262,528 | 7/1966 | Weir . | |
| 3,272,292 | 9/1966 | Sutaruk . | |
| 3,559,786 | 2/1971 | Long . | |
| 3,575,269 | 4/1971 | Sherman | 192/58 B |
| 4,046,239 | 9/1977 | Tinholt | 192/58 B |
| 4,134,484 | 1/1979 | Lansinger . | |
| 4,181,205 | 1/1980 | Mennucci et al. . | |
| 4,280,609 | 7/1981 | Cruise | 192/70.12 X |

Primary Examiner—George H. Krizmanich
Attorney, Agent, or Firm—D. A. Rowe; L. J. Kasper

[57] ABSTRACT

A rotary fluid coupling device is provided of the type including a first rotatable coupling assembly (13) comprising a housing member (15) and a die cast cover member (17). An input coupling member (11) is disposed in a fluid operating chamber (33) and cooperates with an adjacent surface of the cover member (17) to define a viscous shear space therebetween. When the shear space is filled with viscous fluid, torque can be transmitted from the input to the output, such torque transmission resulting in the generation of a substantial amount of heat. The cover member (17) includes a plurality of cooling fins which are divided into a plurality of regions (61). Within each of the regions (61) is a radially-extending cooling fin (63) and a plurality of full-length, parallel cooling fins (65). Also included within each region (61) is a plurality of shorter cooling fins (67) and (69) which are also parallel to the radially-extending cooling fins (63). The parallel fin pattern results in greater total cooling fin length within a given finned area, thus substantially improving the heat dissipation capability of the cover member (17) and the torque-transmitting capability of the coupling device.

22 Claims, 8 Drawing Figures

PRIOR ART

| No. | L | h/H | A/(A+a) |
|---|---|---|---|
| 1 | 1.65 | 1.00 | 1.00 |
| 2 | 1.15 | .58 | .79 |

FIG. 8

FLUID COUPLING DEVICE HAVING IMPROVED HEAT DISSIPATION

CROSS-REFERENCE TO RELATED APPLICATION

This application is a continuation-in-part of U.S. Ser. No. 725,683, filed Apr. 22, 1985, now abandoned.

BACKGROUND OF THE DISCLOSURE

The present invention relates to rotary torque-transmitting coupling devices, and more particularly to such devices wherein heat is generated as a result of the torque transmission, and the ability to dissipate such heat represents a limiting factor on the torque-transmitting capability of the device.

Although the present invention may be used with various types and configurations of rotary torque-transmitting coupling devices, it is especially adapted for use with rotary fluid coupling devices, and will be described in connection therewith.

Rotary fluid coupling devices of the type which may benefit from the use of the present invention have found many uses, one of the most common of which is to drive the cooling fan associated with the radiator of vehicle engines. Such coupling devices are frequently referred to as "viscous fan drives" because such couplings utilize a high-viscosity fluid to transmit torque, by means of viscous shear drag, from an input coupling member (clutch) to an output coupling member (housing) to which is bolted the cooling fan.

More specifically, this invention is especially advantageous when used on a relatively high torque viscous fan drive, i.e., a fan drive which is capable of transmitting to the cooling fan in the range of about 2 horsepower to about 12 horsepower. Typically, such high torque or high horsepower fan drives include an output coupling assembly comprising a cast aluminum housing and a die cast aluminum cover. The input coupling member and the die cast cover normally define a plurality of interdigitated lands and grooves which define the shear space. When this shear space is filled with viscous fluid, torque is transmitted from the input coupling member to the output coupling assembly, in response to rotation of the input coupling.

During torque transmission, substantial heat is generated as a result of the shearing of the viscous fluid between the interdigitated lands and grooves. The amount of heat generated is generally proportional to the "slip" speed of the fan drive, i.e., the difference between the speed of the input coupling and the speed of the output coupling. It is generally well understood by those skilled in the art that, for many rotary torque-transmitting coupling devices, and especially for viscous fan drives, the ability to transmit torque is limited by the ability of the device to dissipate the heat generated as a result of torque transmission. For example, in a viscous fan drive, if the temperature of the viscous fluid exceeds a certain maximum temperature, the result will be a deterioration in the viscous properties of the viscous fluid, resulting in a loss of torque-transmitting capability of the fluid.

In viscous fan drives of the type described above in which a cast cover forms part of the shear space, the cast cover is also the primary heat dissipating element of the device. Therefore, it has been conventional practice in the viscous fan drive art to have a plurality of cooling fins cast integrally with the cover. It is now becoming recognized by those skilled in the art that the majority of the heat is dissipated by fins which are located axially adjacent the viscous shear area of the coupling device. It has also been generally accepted by those skilled in the art that heat dissipation is generally proportional to the total length of cooling fins located in the primary heat dissipation region.

As may be seen by reference to U.S. Pat. Nos. 2,963,135 and 3,075,691, it has been conventional practice since the very early days of the viscous fan drive industry to have the cooling fins oriented radially, primarily to facilitate the radially outward flow of air which carries away the heat transmitted from the shear space to the cooling fins. As may be seen from the above-referenced patents, it also has been conventional practice to alternate longer and shorter radial fins in an attempt to increase the total length of cooling fins, without having the fins disposed too close together. As may be seen by reference to U.S. Pat. No. 4,134,484, it is still common practice, after all these years, to utilize the same basic cooling fin pattern.

As the torque-transmission requirements of viscous fan drives have increased over the years, thus increasing the need to dissipate heat, the primary solution attempted by those skilled in the art has been to increase the total number of cooling fins, resulting in adjacent fins being closer together. This is a generally undesirable solution because the die required to cast such a cover becomes much more expensive, requires more maintenance, and has a shorter die life. Therefore, it is generally recognized that it is undesirable to have adjacent cooling fins closer together than some predetermined, minimum distance of separation.

Given the need for greater heat dissipation, and the recognized limitations on increasing the number of cooling fins as discussed above, those skilled in the art have even attempted to add additional structure to increase the flow of air over the cooling fins. U.S. Pat. No. 4,181,205 discloses a viscous fan drive including an arrangement of fan blades located adjacent the front of the fan drive cover, in an attempt to increase the amount of heat dissipated from the cooling fins by increasing the flow of air over the cooling fins. Such an arrangement, although possibly effective, would add substantially to the size, weight, complexity, and cost of the fan drive and would in addition usurp a portion of the fan drive output horsepower, simply to drive the fan blade arrangement.

Accordingly, it is an object of the present invention to provide an improved rotary torque-transmitting coupling device of the type having cooling fins which are generally radially oriented to facilitate radial airflow, wherein the total fin length is increased to increase heat dissipation.

It is another object of the present invention to provide a coupling device which is capable of achieving the above-stated objects and wherein the element equipped with the cooling fins is a die casting, made in accordance with good die casting practices.

While those skilled in the art have been attempting to provide viscous fan drives having greater heat dissipation capability, there has, at the same time, been a demand by vehicle manufacturers for engine components such as viscous fan drives to be lighter and less expensive. Thus, it is not entirely satisfactory to achieve greater heat dissipation capability in a viscous fan drive simply by increasing the total fin length (and fin area), which also increases the total material content and material cost.

Although various cooling fin configurations have been illustrated in various prior art patents, it has been conventional practice in designing relatively high-torque viscous fan drives to provide cooling fins which have a generally uniform nominal height over most of the radial extent thereof.

Accordingly, it is another object of the present invention to provide a coupling device which is capable of achieving the previously-stated objects, but wherein the cooling fins are configured to limit the fin area, and thus the material content and cost, without any substantial reduction in heat dissipation capability.

It may be seen from the above objects that it is an overall object of the invention to provide a coupling device having greater cooling efficiency, i.e., a greater heat dissipation capability per unit volume of material.

SUMMARY OF THE INVENTION

The above and other objects of the invention are accomplished by the provision of an improved rotary coupling device of the type including a first rotatable coupling assembly comprising a housing member and a cover member cooperating to define a coupling chamber therebetween. A second rotatable coupling member is disposed in the coupling chamber and is rotatable relative to the first rotatable coupling assembly. The forward surface of the second coupling member and an adjacent surface of the cover member cooperate to define a torque-transmitting region therebetween. A control means is operable to control the amount of torque transmission between the first rotatable coupling assembly and the second rotatable coupling member in response to variations in a predetermined condition. The rotary coupling device is of the type in which the torque-transmitting capability of the coupling device is limited at least in part by the ability of the coupling device to dissipate heat which is generated as a result of the torque transmission. The cover member includes a plurality of cooling fins disposed on the forward surface of the cover member, the cooling fins being operable to dissipate heat transmitted from the torque-transmitting region by the cover member.

The improved coupling device is characterized by the plurality of cooling fins being arranged in a plurality of groups of cooling fins. Each of the groups of cooling fins comprises one cooling fin oriented generally radially, and the remainder of the cooling fins in each group being oriented generally parallel to the one radially-oriented cooling fin, over at least a major portion of the length thereof. This cooling fin pattern increases substantially the total possible fin length within a given finned area, and increases the resulting heat dissipation.

In accordance with another aspect of the present invention, in accordance with good casting practices, each of the cooling fins within each group is separated from each adjacent cooling fin within the same group by a predetermined, minimum distance.

In accordance with still another aspect of the present invention, the improved coupling device is characterized by the cooling fins having a nominal height H at a location disposed axially forward of the outer periphery of the viscous shear space. The cover member defines a raised, annular reservoir-defining portion having a height of approximately H. The height of at least a major portion of the cooling fins decreases in a radially-inward direction from the nominal height H to a height h adjacent the reservoir-defining portion, the height h being substantially less than the nominal height H.

DESCRIPTION OF THE PREFERRED EMBODIMENTS

Figure 1:
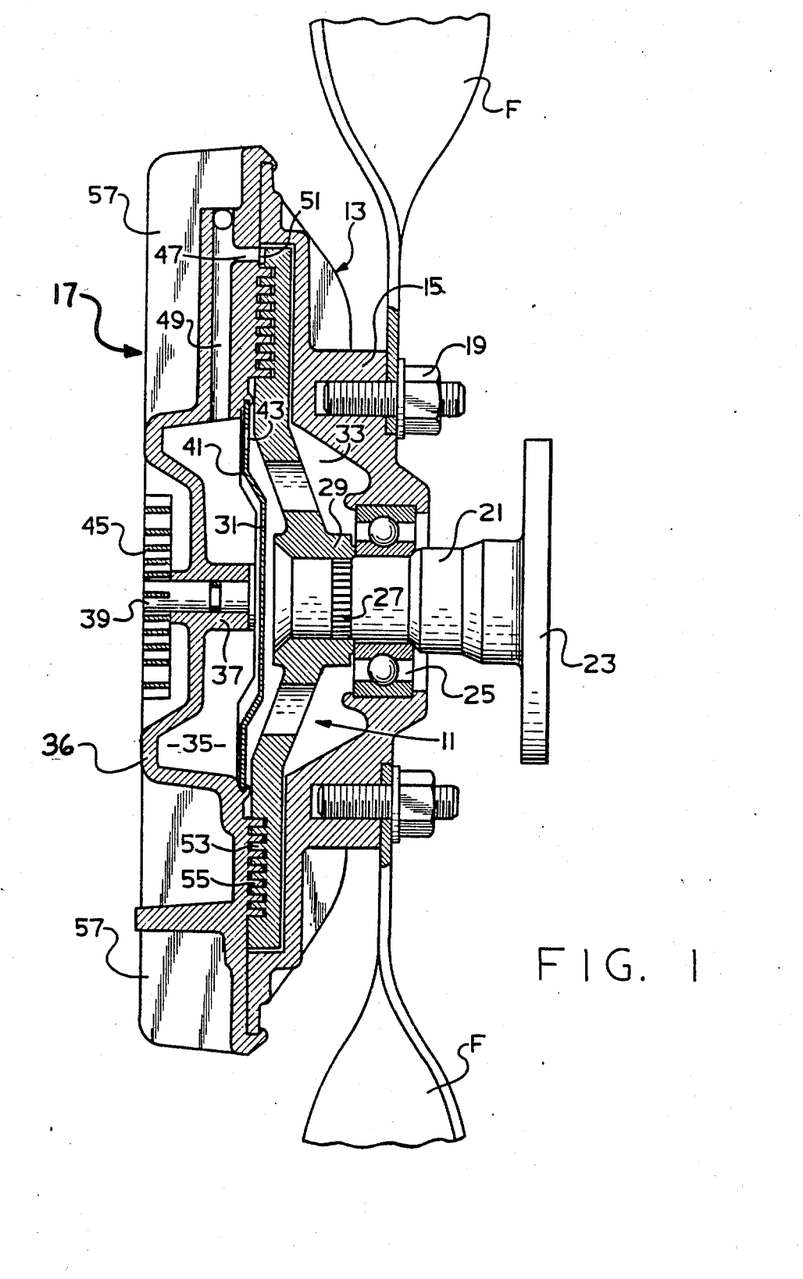
FIG. 1 is an axial cross-section of a typical fluid coupling device of the type with which the present invention may be utilized.

Referring now to the drawings, which are not intended to limit the invention, FIG. 1 illustrates one preferred form of a fluid coupling device (viscous fan drive) of the type with which the present invention may be utilized. The fluid coupling device illustrated in FIG. 1 includes an input coupling member, generally designated 11, and an output coupling assembly, generally designated 13. The output coupling assembly 13 includes a die cast housing member 15 and a die cast cover member 17, the members 15 and 17 being secured together by a rollover of the outer periphery of the cover member 17, as is well known in the art. The fluid coupling device is adapted to be driven by a liquid cooled engine and, in turn, drives a radiator cooling fan F. The fan F may be bolted to the housing member 15 by means of a plurality of nuts 19. It will be understood, however, that the use of the present invention is not limited to any particular configuration of fluid coupling device or an particular application thereof, except as specifically noted hereinafter.

The fluid coupling device includes an input shaft 21 on which the input coupling member 11 is mounted. The input shaft 21 is rotatably driven, typically by means of a flange 23 which may be bolted to the mating flange of an engine water pump. The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft 21 causes rotation of the input coupling member 11.

The housing member 15 and the cover member 17 cooperate to define a fluid chamber which is separated, by means of a circular valve plate 31, into a fluid operating chamber 33 and a fluid reservoir chamber 35. Thus, it may be seen that the input coupling member 11 is disposed within the fluid operating chamber 33.

The cover member 17 defines a raised, annular reservoir-defining portion 36, which is disposed to be generally concentric about the axis of rotation of the device, and further defines a generally cylindrical shaft support portion 37, and rotatably disposed within the portion 37 is a valve shaft 39 extending outwardly (to the left in FIG. 1) through the cover member 17. Attached to the inner end (right end in FIG. 1) of the valve shaft 39 is a valve arm 41, the general construction of which forms no part of the present invention, but which may be better understood by reference to U.S. Pat. No. 3,055,473, assigned to the assignee of the present invention and incorporated herein by reference. Movement of the valve arm 41 controls the flow of fluid from the reservoir chamber 35 to the operating chamber 33, through a fill opening 43 formed in the valve plate 31.

Operatively associated with the outer end of the valve shaft 39 is a temperature-responsive bimetal coil 45. The manner in which the bimetal coil 45 operates to control the movement of the valve arm 41, in response to variations in a predetermined temperature condition, is well known in the art, is not an essential feature of the present invention and will not be described further.

The cover member 17 defines an axial passage 47 in communication with the fluid operating chamber 33, and a radial passage 49 which provides fluid communication from the axial passage 47 to the fluid reservoir chamber 35. Disposed adjacent the axial passage 47 is a pumping element (wiper) 51, operable to engage the relatively rotating fluid in the operating chamber 33 to generate a localized region of relatively higher fluid pressure, and continually pump a small quantity of fluid back into the reservoir chamber 35, through the passages 47 and 49, and is well known in the art.

In the subject embodiment of the invention, the input coupling member 11 includes a forward surface which defines a plurality of annular lands 53. The adjacent surface of the housing member 17 forms a plurality of annular lands 55. The annular lands 53 and 55 are interdigitated to define a serpentine-shaped viscous shear space therebetween. It is believed that in view of above-incorporated U.S. Pat. No. 3,055,473, those skilled in the art can fully understand the construction and operation of the fluid coupling device illustrated in FIG. 1, as well as the various flow paths for the viscous fluid contained therein. As noted in the background portion of the specification, when torque is transmitted from the vehicle engine by means of the input shaft 21 to the input coupling member 11, the result is a shearing of the viscous fluid contained in the shear space between the annular lands 53 and 55. This shearing of the viscous fluid results in the generation of a substantial amount of heat which must be dissipated primarily by the cover member 17.

Figure 2:
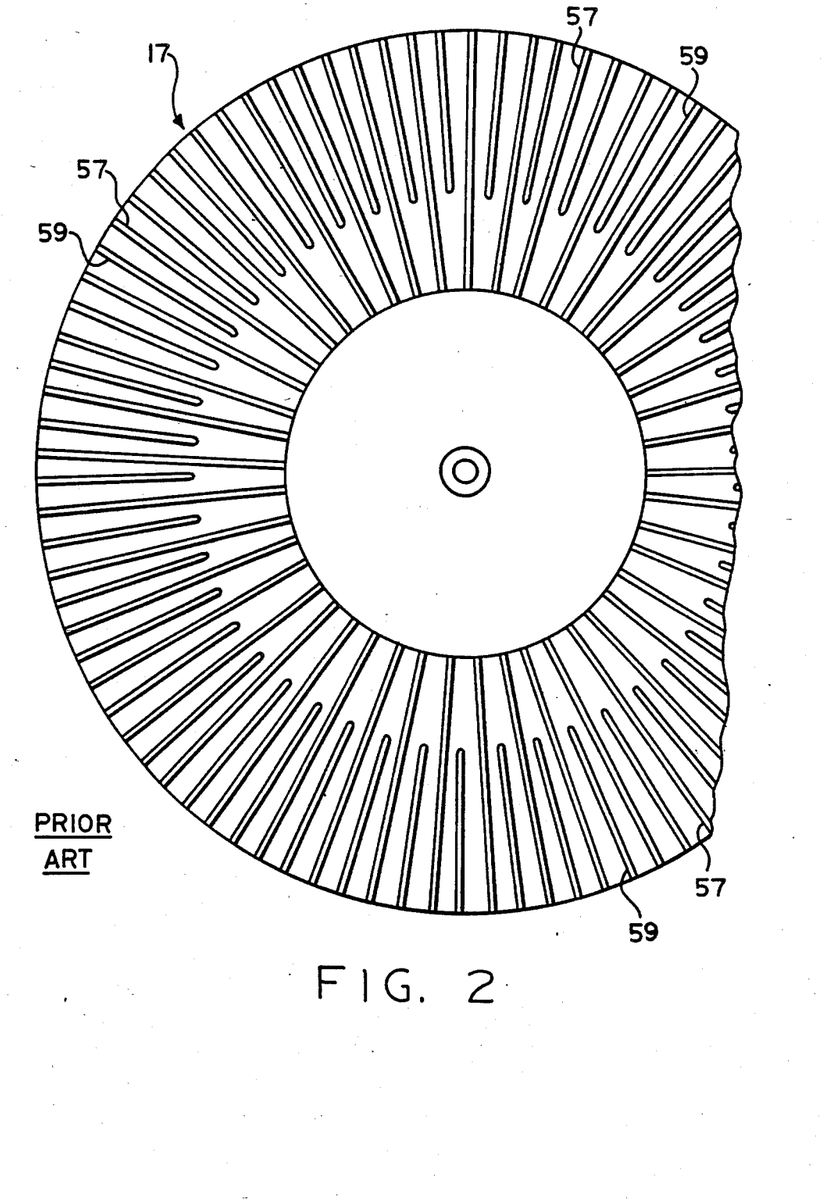
FIG. 2 is a front plan view, of the fluid coupling device of FIG. 1, A showing only the cast cover member, wherein the cast cover member is made in accordance with the prior art.

Referring now to FIG. 2, in conjunction with FIG. 1, it may be seen that the prior art version of the cover member 17 included a plurality of relatively longer radial cooling fins 57, and disposed between each pair of adjacent fins 57, a relatively shorter radial cooling fin 59. It may also be seen in FIG. 2 that, in order to get sufficient total fin length, and sufficient heat dissipation, it became necessary to increase the total number of fins, such that the distance of separation between adjacent fins is much less than a predetermined, minimum distance necessary to comply with good die casting practices. In the prior art radial fin pattern illustrated in FIG. 2, the distance of separation between adjacent relatively longer cooling fins 57, at the radially inner periphery thereof, is generally acceptable. However, the distance of separation between the radially inner end of each of the relatively shorter cooling fins 59 and the two adjacent longer cooling fins 57 is substantially less than is desirable.

Figure 3:
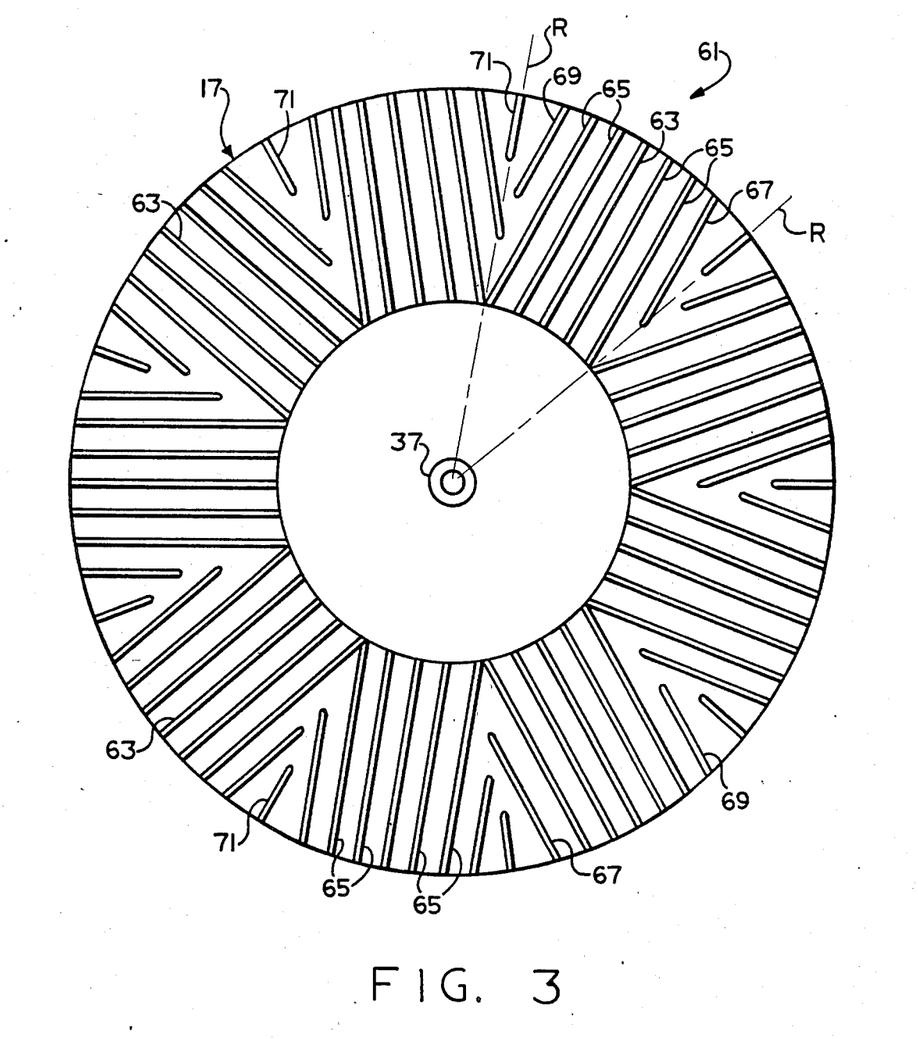
FIG. 3 is a front plan view, of the fluid coupling device of FIG. 1, showing only the cast cover member, wherein the cast cover member is made in accordance with the present invention.

Referring now to FIG. 3, the pattern of cooling fins in accordance with the present invention will be described. FIG. 3 illustrates a front plan view of the die cast cover member 17, and it will be noted by comparing FIG. 3 to FIG. 2 that the cover member 17 utilizing the present invention is smaller in diameter than the prior art cover member 17, for reasons which will be explained subsequently. Referring again to FIG. 3, it may be seen that the entire finned area of the cover member 17 is divided into a plurality of substantially identical regions 61, each of the regions 61 being bordered by an adjacent pair of radially-extending lines R. In the subject embodiment, the cover member 17 is divided into nine of the regions 61, and therefore, each adjacent pair of radially-extending lines R define therebetween an acute angle of 40 degrees. It will be understood by those skilled in the art from a reading and understanding of this specification that, within the scope of the present invention, the number of regions 61, and therefore the angle defined between adjacent radially-extending lines R, could be somewhat greater or less than nine.

Because each of the regions 61 is substantially identical, only one such region 61 will be described hereinafter, it being understood that each of the others is the same. Within each of the regions 61 there is one generally radially-extending cooling fin 63 which, in the subject embodiment, is illustrated as being centrally-disposed within the region 61, although that is not an essential feature of the present invention. On either side of the radially-extending cooling fin 63 is a pair of full-length, parallel cooling fins 65. By "parallel" is meant that each of the cooling fins 65 is substantially parallel to the radially-extending cooling fin 63. In addition, each region 61 includes a somewhat shorter cooling fin 67 which is oriented substantially parallel to the adjacent cooling fin 65, and an even shorter cooling fin 69 which is oriented substantially parallel to its adjacent cooling fin 65. Finally, each region 61 includes one very short cooling fin 71, the orientation of which is not critical, but which is shown in FIG. 3 as being generally radially oriented. Each of the cooling fins 71 is included primarily to divide the space between the adjacent fins 67 and 69. Therefore, it should be understood that when reference is made herein, and in the claims of this application, to "the remainder of said cooling fins in each group (region 61) being oriented substantially parallel" to the radially-extending cooling fins 65, the very short cooling fins 71 are not generally included within that statement.

The parallel arrangement of the cooling fins 63, 65, 67, and 69, as shown in FIG. 3, is a very important aspect of the present invention because it permits nearly the maximum, possible fin length to be located in each of the regions 61 without having the distance of separation of adjacent fins less than the predetermined, minimum distance. The one exception to the above statement which may be seen in FIG. 3 is that the parallel cooling fins 65 toward the "end" of each region 61 cooperate with the parallel cooling fin 65 located toward the near end of the adjacent region 61 to form a "V". Referring again briefly to FIG. 2, it may be seen that with the prior art arrangement of cooling fins, it would be impossible to die cast the cover member 17 with any of the adjacent relatively longer cooling fins 57 forming a "V" because the included angle therebetween would be only about 7 or 8 degrees. However, it is one aspect of the present invention that, because of the provision of a plurality of regions of generally parallel cooling fins, it is possible to permit cooling fins from adjacent regions to form a "V" as shown in FIG. 3 because, with the present invention, the included angle therebetween is relatively large, and does not interfere with good die casting practices. In the subject embodiment, with nine of the regions 61, each representing a 40-degree segment of the entire cover member 17, the included angle between each pair of cooling fins 65 which form a "V" is likewise 40 degrees.

Figure 4:
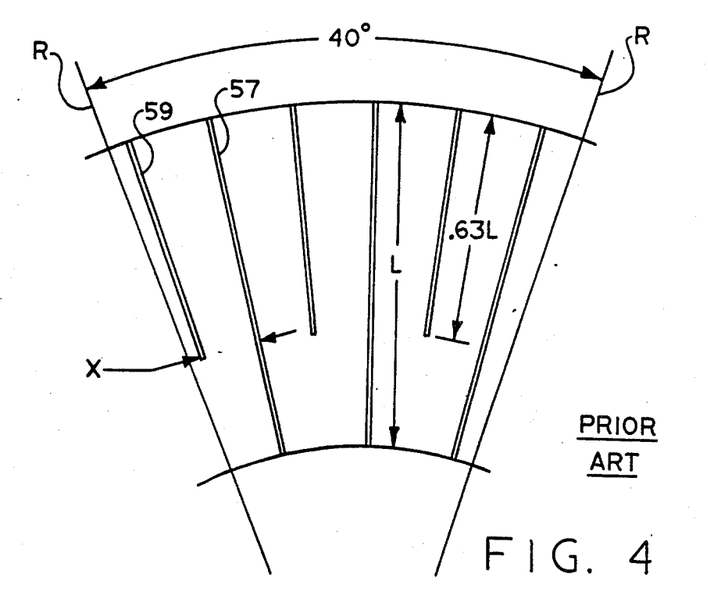
FIG. 4 is an enlarged, somewhat schematic view, similar to FIG. 2, illustrating a segment of the prior art cooling fins.
Figure 5:
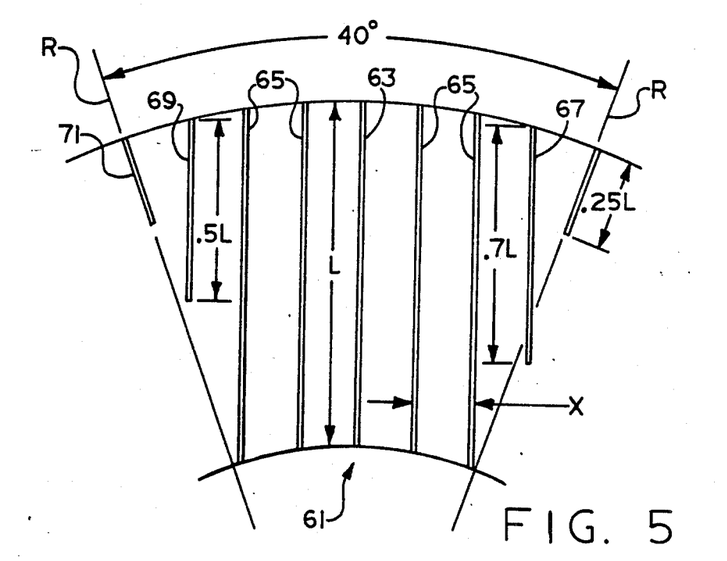
FIG. 5 is an enlarged, somewhat schematic view, similar to FIG. 3, illustrating a segment of the cooling fins made in accordance with the present invention.

Referring now to FIGS. 4 and 5, which are schematic representations of the cooling fin patterns of the prior art and of the invention, a comparison will be made to illustrate schematically that the present invention results in substantially greater total cooling fin length within a given finned area, i.e., within each of the regions 61. In making the comparison of the prior art and the invention, instead of having the cooling fins 57 and 59 of the prior art spaced very close together as shown in FIG. 2, it is the intent of FIGS. 4 and 5 to show that the invention provides greater total fin length than the prior art, if both the invention and the prior art comply with the requirement that each cooling fin be separated from each adjacent cooling fin within the same group (or region 61) by a predetermined, minimum distance.

Accordingly, it may be seen that in the prior art arrangement of FIG. 4, the cooling fins 57 and 59 have been arranged such that the radially inner end of each of the shorter cooling fins 57 is separated (circumferentially) from each adjacent relatively longer cooling fin 57 by a predetermined, minimum distance X. Similarly, in FIG. 5, the distance of separation of each of the cooling fins (63, 65, 67, 69, or 71) from each adjacent cooling fin (with the exception of the previously-described "V" arrangement) is the same predetermined, minimum distance X.

Referring still to FIGS. 4 and 5, it may be seen in FIG. 4 that each of the relatively longer cooling fins 57 has a length L, while each of the relatively shorter cooling fins 59 has a length point 0.63 L. Therefore, within each 40-degree segment or region of the prior art cooling fin pattern, there are three of the relatively longer cooling fins 57 and three of the relatively shorter cooling fins 59, and the total cooling fin length T (prior art) in the region is:

$$T \text{ (prior art)} = 3(L) + 3(0.63\, L);$$

$$T \text{ (prior art)} = 4.89\, L.$$

Turning now to the invention of FIG. 5, each of the radially-extending cooling fins 63, and each of the full-length, parallel cooling fins 65 also have a length L. Each of the somewhat shorter cooling fins 67 has a length 0.7 L, and each of shorter cooling fins 69 has a length 0.5 L. Finally, each of the very short cooling fins 71 has a length 0.25 L. Therefore, the total cooling fin length T (INV.) is:

$$T \text{ (INV.)} = 5(L) + 0.69\, L + 0.5\, L + 0.25\, L; \text{ and}$$

$$T \text{ (INV.)} = 6.44\, L.$$

By comparing the above results from FIGS. 4 and 5, it may be seen that the invention provides approximately 30 percent greater total cooling fin length than does the prior art radial cooling fin arrangement. Thus, the present invention makes it possible to provide substantially greater total cooling fin length than the prior art, if the same distance of separation (X) between adjacent cooling fins is utilized, or alternatively, to provide approximately the same total cooling fin length (and heat dissipation) while providing greater distance of separation between adjacent cooling fins. As was described in the background of the specification, this latter option results in a die which is less expensive, requires less maintenance, and will have a longer useful life.

As another option when utilizing the present invention, the size of the cover member 17 may be reduced. As was noted in connection with FIGS. 2 and 3, the cover member 17 made in accordance with the invention in FIG. 3 has a smaller diameter than the prior art cover member shown in FIG. 2. As can now be understood by those skilled in the art, because the present invention results in greater total fin length for a given finned area, it is also possible by using the invention to reduce the size of the finned area. Therefore, FIG. 3 represents an embodiment of the present invention in which the total fin length is actually less than in the prior art shown in FIG. 2, but the overall diameter of the cover member 17 has been reduced substantially, and the distance of separation between adjacent fins has been increased, to obtain the die casting benefits described previously. Thus, the use of the present invention provides the following options:

(1) increase the total fin length and heat dissipation capability of the cover;
(2) keep the total fin length and heat dissipation the same, but reduce the size, weight, and cost of the cover member;
(3) keep the total fin length and heat dissipation the same, but increase the distance of separation between adjacent fins for better casting practices; and
(4) any combination of one or more of the above.

In the illustration of FIG. 1 each of the cooling fins 57 is shown as having a generally constant height over substantially the entire radial extent of the cooling fin. As used herein, the term "height" in reference to a cooling fin will be understood to refer to the extent of the cooling fin, in an axial direction (to the left in FIG. 1), from the front surface of the cover member 17.

In the description of the embodiment of the invention in FIGS. 1-5, there has been no discussion of the height of the cooling fins 57, or of the cooling fins 63 through 71, and it will be apparent to those skilled in the art upon reading the present specification that is the embodiment of FIGS. 1-5, all of the cooling fins may be conventional (as in FIG. 1) having the same, generally constant height. However, in a preferred embodiment of the invention, the cooling fins illustrated in FIGS. 3 and 5 are made in accordance with a further aspect of the present invention illustrated in FIGS. 6-8.

Figure 6:
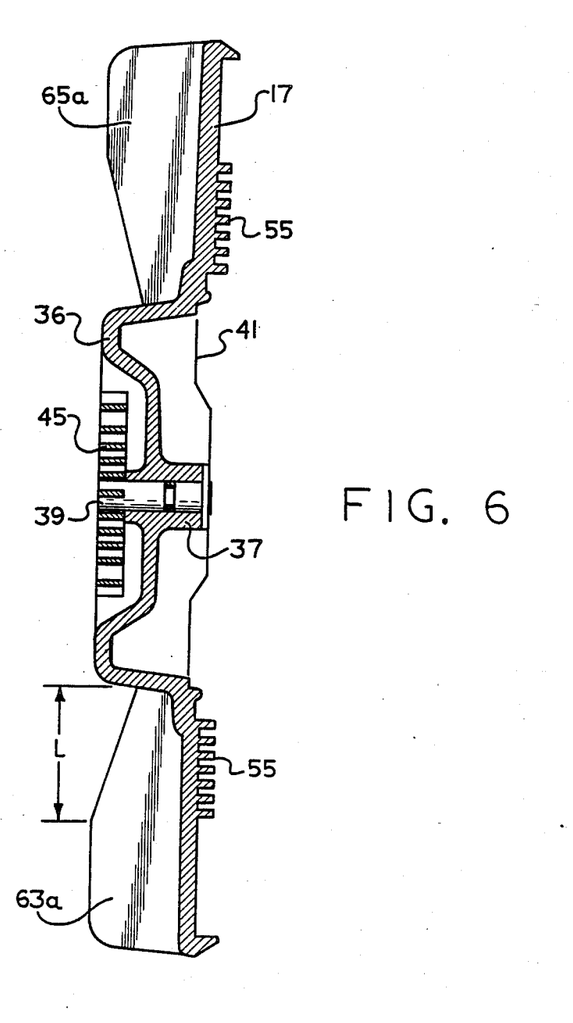
FIG. 6 is an axial cross section, similar to FIG. 1, illustrating only the cover subassembly, made in accordance with another aspect of the present invention.
Figure 7:
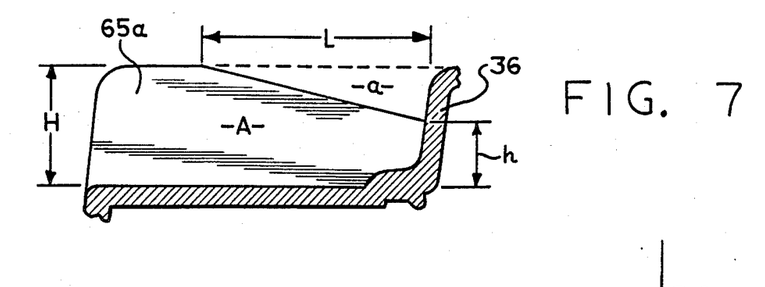
FIG. 7 is an enlarged, somewhat schematic view, illustrating the geometry of the cooling fins shown in the FIG. 6 embodiment.
Figure 8:
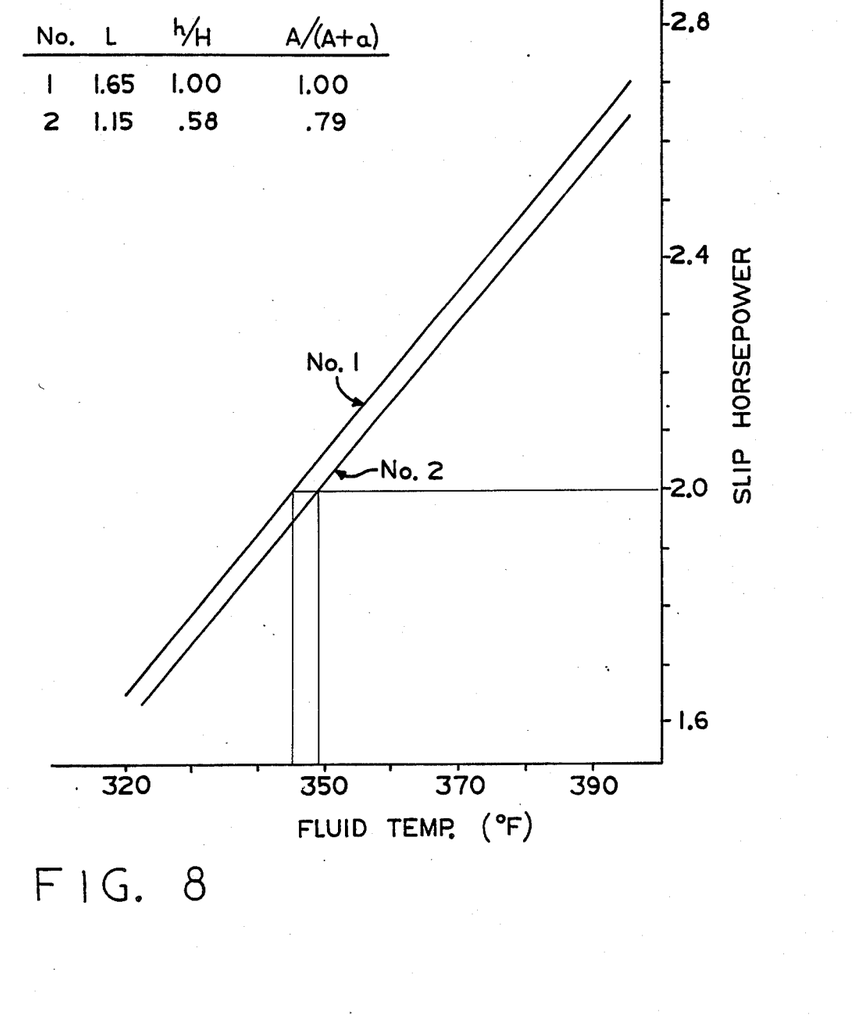
FIG. 8 is a graph of slip horsepower versus fluid temperature, comparing the aspect of the invention illustrated in FIGS. 6 and 7 to the conventional cooling fin configuration.

FIGS. 6-8

Referring now primarily to FIG. 6, there is illustrated another preferred embodiment of the invention which is taken on a different plane than is FIG. 1, to illustrate only cooling fins which are uninterrupted by other structure. In FIG. 6, those elements which are identical to those in FIG. 1 bear the same reference numeral, and those elements which are modified bear the same reference numeral, accompanied by the designation "a".

Referring now to FIG. 7, in conjunction with FIG. 6, it may be seen that each of the cooling fins 63a and 65a which extend radially-inward to the reservoir-defining portion 36 include an inner portion which is tapered, i.e., has a gradually decreasing height in the radially-inward direction. Each of the cooling fins 63a and 65a has a nominal height H which, in the subject embodiment, is approximately equal to the height of the reservoir-defining portion 36. Preferably, each of the fins 63a and 65a has the nominal height H at a location disposed axially forward of the outer periphery of the viscous shear space. As used herein, the term "outer periphery" in reference to the viscous shear space can refer to either the outer periphery of the input coupling member 11, or to the radially-outermost land 55 defined by the cover member 17.

As may best be seen in FIG. 7, each of the lands 65a begins, at a location which is a radial distance L from the portion 36, to taper radially-inwardly, decreasing from the nominal height H to a height h adjacent the portion 36. Referring still to FIG. 7, it may be seen that the tapered fin 65a of the invention has a total fin area A which, as compared to the conventional fin of FIG. 1, results in a saving of fin area designated "a".

Referring now to FIG. 8, there is illustrated a graph of slip horsepower versus the fluid temperature of the viscous fluid. Accompanying the graph is a table which relates to the schematic view of the fin 65a in FIG. 7. In developing the subject embodiment of the present invention a number of different samples were tested and the graph of FIG. 8 is a comparison of two of those samples, labeled No. 1 and No. 2. Sample No. 1 was a fluid coupling device including a cover member 17 having cooling fins of the type shown in FIG. 1 for which the height of the fins was the full nominal height H over the entire radial extent. Thus, the height of the fin adjacent the portion 36 is the same as the nominal height H and the h/H for sample No. 1 is indicated as 1.00. Similarly, the area A of the fin for sample No. 1 is identified at 1.00.

By way of comparison, sample No. 2 has a taper which extends radially-outwardly from the portion 36 a radial distance L which is 1.15 inches (as compared to the overall radial length of the entire fin of 1.65 inches). In sample No. 2, the height h of the fin, adjacent the portion 36, is 0.58 of the nominal height H of the radially-outer portion of the fin. Each of the cooling fins 65a in sample No. 2 had an actual fin area A of 0.79 of the nominal fin area A + a. In other words, the cooling fins 65a in sample No. 2 had a total fin area (and weight and material content) which is 21 percent less than the conventional full-height fin.

Referring again to the graph of FIG. 8 it may be seen that the tapered fin of the present invention, although having 21 percent less area, resulted in an almost negligible loss in heat dissipation capacity. For example, at a slip horsepower of 2.0 horsepower, unit No. 1 would be able to dissipate enough heat to keep the fluid temperature at approximately 345 degrees, whereas unit No. 2, with 21 percent less fin area would be able to maintain the fluid temperature at 349 degrees, a temperature increase of only 4 degrees Fahrenheit.

It will be understood by those skilled in the art that for any given fluid coupling device configuration, it will be necessary to perform fairly routine experimentation, of the type represented by FIGS. 7 and 8, to determine how much of the fin area can be removed before the loss of heat dissipation capacity becomes significant. Based upon the development of the various embodiments leading to the present invention, it would appear that preferred embodiments of the invention would generally conform to the following:

(a) the reservoir-defining portion 36 would have a height at least equal to the height h and as much as approximately the nominal height H; and (b) the height h would be in a range of about 0.4 to about 0.8 of the nominal height H, and more preferably in a range of about 0.5 to about 0.7 of the nominal height H.

The invention has been described in great detail sufficient to enable one skilled in the art to make and use the same. It is believed that upon a reading and understanding of the following specification, various alterations and modifications will become apparent to those skilled in the art. For example, it should be apparent that it would be possible to have a different number of the parallel cooling fins 65 than is shown in FIGS. 3 and 5, or to have a somewhat different arrangement of the shorter cooling fins 67 and 69. It is intended that the present invention includes all such alterations and modifications insofar as they come within the scope of the appended claims.

I claim:

1. A rotary coupling device of the type including a first rotatable coupling assembly comprising a housing member and a cover member cooperating to define a coupling chamber therebetween, a second rotatable coupling member disposed in said coupling chamber and being rotatable relative to said first rotatable coupling assembly, the forward surface of said second coupling member and an adjacent surface of said cover member cooperating to define a torque-transmitting region therebetween, control means operable to control the amount of torque transmission between said first rotatable coupling assembly and said second rotatable coupling member in response to variations in a predetermined condition, said rotary coupling device being of the type in which the torque-transmitting capability of said coupling device is limited at least in part by the ability of said coupling device to dissipate heat generated as a result of said torque transmission, said cover member including a plurality of cooling fins disposed on the forward surface of said cover member and being operable to dissipate heat transmitted from said torque-transmitting region by said cover member; characterized by:

(a) said plurality of cooling fins being arranged in a plurality of groups of cooling fins; and (b) each of said groups of said cooling fins comprising one cooling fin oriented generally radially, the remainder of said cooling fins in each group being oriented substantially parallel to said one radially-oriented cooling fin, over at least a major portion of the length thereof, thereby to increase substantially the total possible fin length within a given finned area, and the resulting heat dissipation.

2. A rotary coupling device as claimed in claim 1 characterized by said remainder of said cooling fins in each group which are parallel to said one radially-oriented cooling fin comprising a plurality of cooling fins having substantially the same radial length as said one radially-oriented cooling fin.

3. A rotary coupling device as claimed in claim 2 characterized by said remainder of said cooling fins in each group which are parallel to said one radially-oriented cooling fin further comprising a plurality of radially shorter cooling fins.

4. A rotary coupling device as claimed in claim 3 characterized by said cover member including an additional short cooling fin disposed between adjacent pairs of said groups of said cooling fins, each of said additional, short cooling fins being disposed in non-parallel relationship with the adjacent cooling fin in each of said adjacent groups of said cooling fins.

5. A fluid coupling device of the type including a first rotatable coupling assembly comprising a housing member and a cover member cooperating to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, said second rotatable coupling member including forward and rearward axially spaced-apart surfaces, one of said cover member and said housing member having a surface closely spaced apart from the respective one of said forward and rearward surfaces of said second coupling member to define therebetween a viscous shear space, said fluid coupling device being operable to transmit torque between said first rotatable coupling assembly and said second rotatable coupling member by means of viscous shear drag, in response to the presence of viscous fluid in said viscous shear space, said valve means being operable to control the quantity of fluid in said viscous shear space in response to variations in a predetermined condition, said one of said cover member and said housing member defining said viscous shear space including a plurality of cooling fins disposed on an outer surface thereof, and being operable to dissipate heat transmitted from said viscous shear space by said one of said cover member and said housing member; characterized by:
(a) said plurality of cooling fins being arranged in a plurality of groups of cooling fins; and
(b) each of said groups of said cooling fins comprising one cooling fin oriented generally radially, the remainder of said cooling fins in each group being oriented substantially parallel to said one radially-oriented cooling fin, over at least a major portion of the length thereof, thereby to increase substantially the total possible fin length within a given finned area, and the resulting heat dissipation.

6. A fluid coupling device as claimed in claim 5 characterized by said remainder of said cooling fins in each group which are parallel to said one radially-oriented cooling fin comprising a plurality of cooling fins having substantially the same radial length as said one radially-oriented cooling fin.

7. A fluid coupling device as claimed in claim 6 characterized by said remainder of said cooling fins in each group which are parallel to said one radially-oriented cooling fin further comprising a plurality of radially shorter cooling fins.

8. A fluid coupling device as claimed in claim 7 characterized by said one of said cover member and said housing member including an additional short cooling fin disposed between adjacent pairs of said groups of said cooling fins, each of said additional, short cooling fins being disposed in non-parallel relationship with the adjacent cooling fin in each of said adjacent groups of said cooling fins.

9. A fluid coupling device of the type including a first rotatable coupling assembly comprising a housing member and a cover member cooperating to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, the forward surface of said second rotatable coupling member and an adjacent surface of said cover member cooperating to define a viscous shear space therebetween, said valve means being operable to control the flow of fluid between said reservoir chamber and said operating chamber in response to variations in a predetermined condition, said fluid coupling device being operable to transmit torque between said first rotatable coupling assembly and said second rotatable coupling member by means of viscous shear drag, in response to the presence of viscous fluid in said viscous shear space, said cover member including a plurality of cooling fins disposed on the forward surface of said cover member and being operable to dissipate heat transmitted from said viscous shear space by said cover member; characterized by:
(a) said plurality of cooling fins being arranged in a plurality of groups of cooling fins; and
(b) each of said groups of said cooling fins comprising one cooling fin oriented generally radially, the remainder of said cooling fins in each group being oriented substantially parallel to said one radially-oriented cooling fin, over at least a major portion of the length thereof, each of the cooling fins within each group being separated from each adjacent cooling fin within the same group by a predetermined, minimum distance.

10. A fluid coupling device as claimed in claim 9 characterized by said remainder of said cooling fins in each group which are parallel to said one radially-oriented cooling fin comprising a plurality of cooling fins having substantially the same radial length as said one radially-oriented cooling fin.

11. A fluid coupling device as claimed in claim 10 characterized by said remainder of said cooling fins in each group which are parallel to said one radially-oriented cooling fin further comprising a plurality of radially shorter cooling fins.

12. A fluid coupling device as claimed in claim 11 characterized by said cover member including an additional short cooling fin disposed between adjacent pairs of said groups of said cooling fins, each of said additional, short cooling fins being disposed in non-parallel relationship with the adjacent cooling fin in each of said adjacent groups of said cooling fins.

13. A fluid coupling device as claimed in claim 9 characterized by said cooling fins having a nominal height H at a location disposed axially forward of the outer periphery of said viscous shear space, said cover member defining a raised, annular reservoir-defining portion disposed to be generally concentric about the axis of said device, said reservoir-defining portion having a height of approximately H, the height of at least a major portion of said cooling fins decreasing in a radially inward direction from said nominal height H to a height h adjacent said reservoir-defining portion, said height h being substantially less than said nominal height H.

14. A fluid coupling device as claimed in claim 13 characterized by said height h being in a range of about 0.4 to about 0.8 of said nominal height H.

15. A fluid coupling device as claimed in claim 13 characterized by said height h being in a range of about 0.5 to about 0.7 of said nominal height H.

16. A fluid coupling device as claimed in claim 13 characterized by each of said cooling fins having a height at least equal to said nominal height H, in a radially-outward direction from said location disposed axially forward of the outer periphery of said viscous shear space.

17. A fluid coupling device of the type including a first rotatable coupling assembly comprising a housing member and a cover member cooperating to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, the forward surface of said second rotatable coupling member and an adjacent surface of said cover member cooperating to define a viscous shear space therebetween, said valve means being operable to control the flow of fluid between said reservoir chamber and said operating chamber in response to variations in a predetermined condition, said fluid coupling device being operable to transmit torque between said first coupling assembly and said second coupling member by means of viscous shear drag, in response to the presence of viscous fluid in said viscous shear space, said cover member including a plurality of cooling fins disposed on the forward surface of said cover member and being operable to dissipate heat transmitted from said viscous shear space by said cover member, said cooling fins having a nominal height H at a location disposed axially forward of the outer periphery of said viscous shear space, said cover member defining a raised, annular reservoir-defining portion disposed to be generally concentric about the axis of said device; characterized by:

(a) the height of at least a major portion of said cooling fins decreasing in a radially inward direction from said nominal height H to a height h adjacent said reservoir-defining portion, said height h being substantially less than said nominal height H.

18. A fluid coupling device as claimed in claim 17 characterized by said raised, annular reservoir-defining portion having a height at least equal to said height h.

19. A fluid coupling device as claimed in claim 17 characterized by said raised, annular reservoir-defining portion having a height of approximately H.

20. A fluid coupling device as claimed in claim 17 characterized by said height h being in a range of about 0.4 to about 0.8 of said nominal height H.

21. A fluid coupling device as claimed in claim 17 characterized by said height h being in a range of about 0.5 to about 0.7 of said nominal height H.

22. A fluid coupling device as claimed in claim 17 characterized by said viscous shear space comprising said forward surface of said second rotatable coupling member and said adjacent surface of said cover member cooperating to define a plurality of interdigitated lands and grooves, said cooling fins having approximately said nominal height H at a location disposed axially forward of the outer periphery of said lands and grooves, and approximately said height h at a location disposed axially forward of the inner periphery of said lands and groove.

* * * * *